United States Patent [19]

Williams

[11] Patent Number: 5,374,024
[45] Date of Patent: Dec. 20, 1994

[54] BANNER BRACKET

[76] Inventor: Jeffrey Z. Williams, 320 E. Adams St., St. Louis, Mo. 63122

[21] Appl. No.: 178,100

[22] Filed: Jan. 6, 1994

Related U.S. Application Data

[63] Continuation-in-part of Ser. No. 107,930, Aug. 17, 1993, Pat. No. 5,320,322.

[51] Int. Cl.⁵ .............................................. F16M 13/00
[52] U.S. Cl. ..................................... 248/514; 116/173; 248/291
[58] Field of Search ............... 248/511, 514, 519, 520, 248/524, 523, 286, 291; 116/173; 403/310, 92; 40/607

[56] References Cited

U.S. PATENT DOCUMENTS

| | | |
|---|---|---|
| 581,991 | 5/1897 | Homan . |
| 1,286,541 | 12/1918 | Cook . |
| 1,339,833 | 5/1920 | Saltmarsh et al. . |
| 1,525,515 | 5/1924 | Socha . |
| 2,733,030 | 1/1951 | Hawthorne ............... 248/40 |
| 3,162,407 | 12/1964 | Yax ............... 248/514 |
| 3,263,356 | 8/1966 | Gilmoure et al. ............... 40/125 |
| 3,599,599 | 8/1971 | Jones ............... 116/173 |
| 3,786,778 | 1/1974 | Palmer ............... 116/173 |
| 3,850,401 | 11/1974 | Snediker ............... 248/291 |
| 4,140,296 | 2/1979 | Guillen ............... 248/445 |
| 4,482,122 | 11/1984 | Grashow ............... 248/514 |
| 4,720,074 | 1/1988 | Gard et al. ............... 248/514 |
| 4,864,962 | 9/1989 | Kuehl et al. ............... 116/174 |
| 4,880,195 | 11/1989 | Lepley ............... 248/219 |
| 4,905,946 | 3/1990 | Lai ............... 403/92 |
| 5,026,028 | 6/1991 | Ooi et al. ............... 256/67 |
| 5,029,799 | 7/1991 | Bernier ............... 248/514 |
| 5,069,416 | 12/1991 | Ennis ............... 248/902 |

OTHER PUBLICATIONS

Eight page advertising brochure, Kalamazoo Banner Works, Kalamazoo, Michigan including "BannerFlex" Banner Mounting Brackets.
Six page pricing guide, Kalamazoo Banner Works, Kalamazoo, Michigan, Sep. 1, 1989.

Primary Examiner—J. Franklin Foss
Attorney, Agent, or Firm—Bruce J. Bowman

[57] ABSTRACT

A banner support bracket includes a plate-like member having a slightly concave rear surface to conform to a support post during mounting, and two spaced-apart upstanding walls defining a channel therebetween. A rod holder assembly is disposed within the channel and removably retains a banner rod through engagement with a cotter pin. The rod holder assembly is vertically movable and selectively securable at various positions along the length of the channel as well as variably tiltable through selected angles from the vertical axis of movement. The ability of the rod holder assembly, and thus the support rod, to assume variable angles permits a wide variety of banner configurations to be supported. Two such banner bracket supports are mounted to a standard in order to hold the longitudinal ends of the banner taut regardless of the angle of cut of the banner ends. A slight cantilever built in to the rod holder assembly helps keep the banner taut.

16 Claims, 6 Drawing Sheets

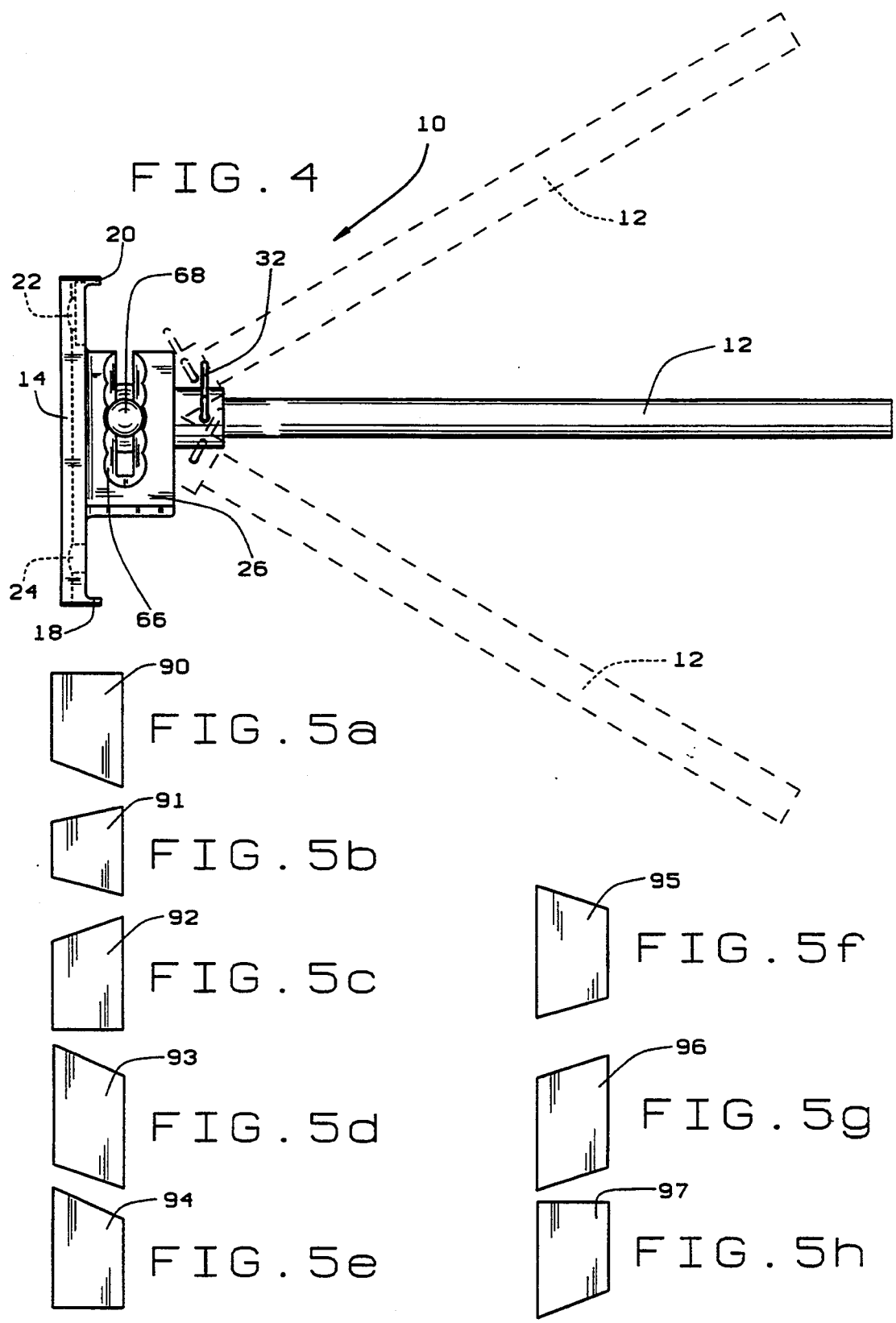

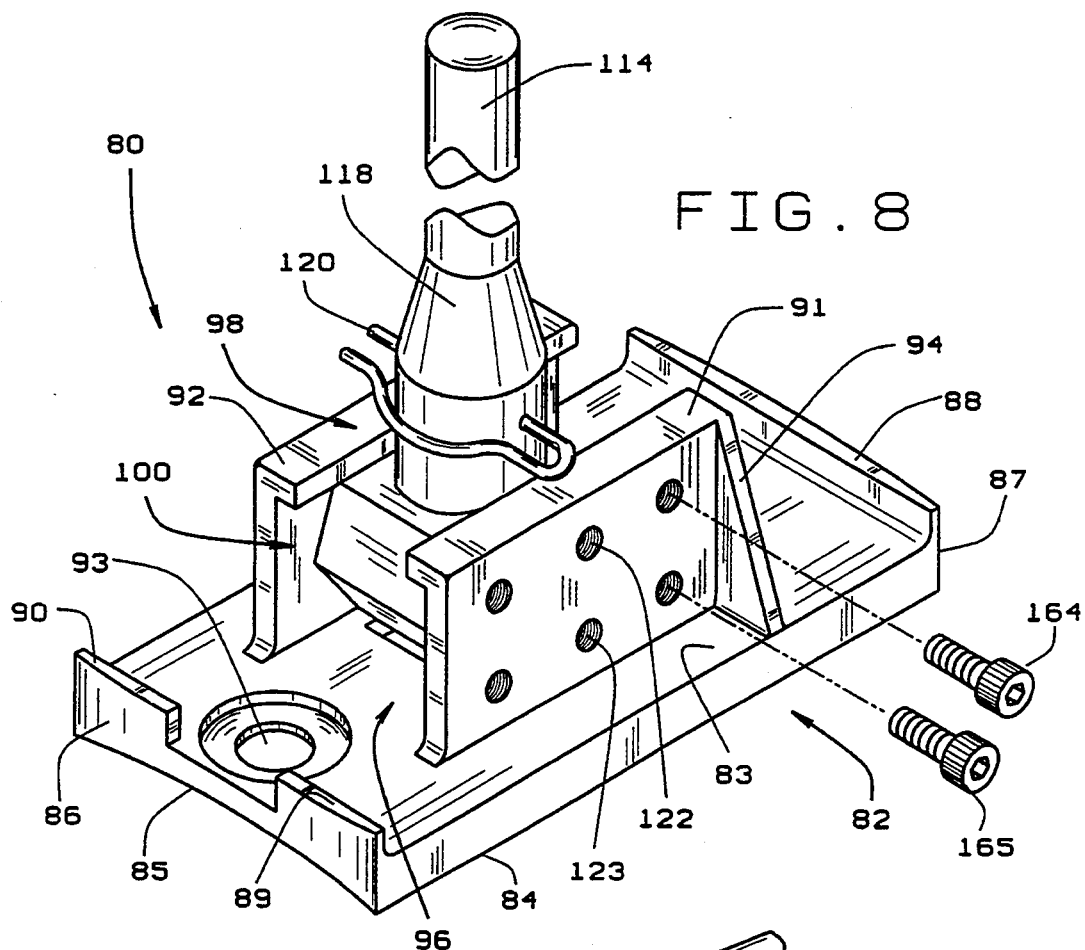
FIG. 8
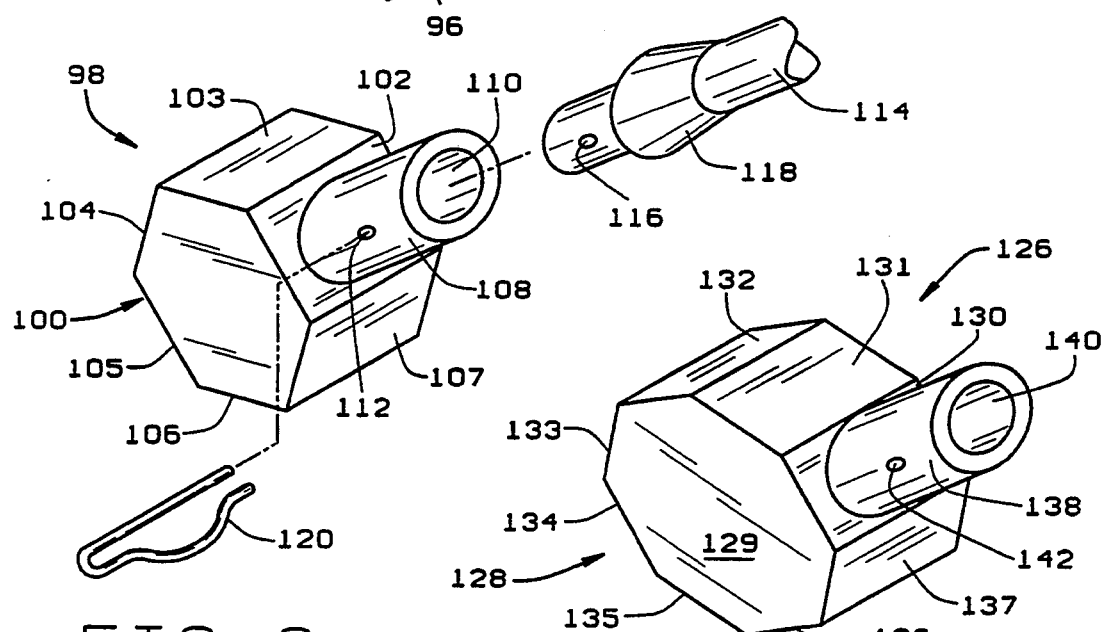
FIG. 9
FIG. 10

BANNER BRACKET

CROSS-REFERENCE TO RELATED APPLICATIONS

The present application is a continuation-in-part of patent application Ser. No. 08/107,930 filed Aug. 17, 1993 entitled "BANNER BRACKET" by the present inventor, now U.S. Pat. No. 5,320,322.

FIELD OF THE INVENTION

The present invention relates generally to banner support assemblies and, more particularly, to a banner support bracket for holding a banner taut via a banner rod.

BACKGROUND OF THE INVENTION

Banners are used by many organizations and municipalities to advertise various events or as general decorations throughout the year and during festivals or the like. The banners are generally supported from light poles, standards, or other similar structures by brackets with integral rods wherein the banner may be easily seen but still be out of reach of the public.

Because of the nature of banners, as opposed to flags, it is necessary to hold both longitudinal ends of the banner such that the banner is kept taut. Usually, each end of the banner includes a pocket or similar elongated opening therein into which is received a support rod. The pocket and rod generally extend the entire length of the banner at the particular longitudinal end of the banner.

Heretofore, various brackets have been developed for holding banners taut. Of these, some brackets have been developed to specifically address and withstand the various wind loads that banners are subjected to due to the fact that they are held taut like a sail and cannot flap and wave to release the wind energy, in contrast to a flag. Other banner brackets have been designed to maintain the banner taut by incorporating a fixed angle into a fixed rod holder.

However, the prior art banner brackets are only capable of supporting banners that are essentially rectangular in shape. The banners therefore have longitudinal ends that are essentially perpendicular to the post onto which the bracket is mounted. Thus, such prior art banner brackets will support only one banner configuration, i.e. the rectangular banner, whereas there are many other possible and more appealing configurations.

What is therefore needed is a bracket for holding a banner support rod that can be vertically adjustable to accommodate various banner lengths. Furthermore, there is a need for a banner support rod holder that is also able to vary the angle of the support rod to accommodate the various angular configurations.

In view of the shortcomings of the prior art, it is thus an object of the present invention to provide a banner support bracket that is capable of supporting a variety of banner configurations.

It is further an object of the present invention to provide a banner support bracket in which the banner rod holder is easily vertically adjustable along the length of the vertical channel.

It is still further an object of the present invention to provide a banner bracket which has a banner rod holder that is angularly adjustable as well as vertically adjustable.

SUMMARY OF THE INVENTION

The present invention provides a banner support bracket for retaining a banner mounting rod having a rod holder assembly that is easily vertically adjustable along an elongate channel and selectively securable at various positions.

The present bracket is for supporting an end of a banner having a banner support rod. In one form thereof, the present invention provides a bracket for holding a banner rod, the bracket comprising a base plate having an upper surface and a lower surface, the base plate adapted to be secured to a post such that the lower surface abuts the post. A pair of spaced apart members is disposed on the upper surface of the base plate, the pair of spaced apart members defining an elongate channel. A rod holder is disposed within the channel and is adapted to retain a banner rod for supporting an end of a banner. The rod holder is movable along the length of the elongate channel and is selectively securable at various locations such that the vertical position of the banner rod may be varied relative to ground.

The banner bracket may be characterized by the rod holder comprising a body having two essentially parallel end faces that are disposed adjacent inner surfaces of the spaced apart members. A plurality of sides are disposed essentially perpendicular to the faces forming a polygon-shaped body. A tubular member is disposed on one of the plurality of sides for supporting an end of the banner rod. One of the spaced apart members includes a plurality of pairs of threaded bores for receiving set screws, the set screws contacting one face of the body to selectively secure the rod holder along the channel.

In another form the banner bracket may be characterized by the rod holder comprising a spherical body with a tubular member disposed on the spherical body and radially extending therefrom and adapted to retain a banner rod, along with a pair of bores each extending through said spherical body. Each of the pair of spaced apart members includes an elongate slot on an inner surface thereof and extending along the length of the channel. The spherical body engages the elongate slots, and a plurality of pairs of bores for receiving set pins. The set pins extend through the upper and lower bores of the spherical body and the pairs of bores of each spaced apart member to selectively secure the rod holder along the channel.

Further, the present invention provides a bracket assembly for holding a first and second banner support rod to support and maintain a banner taut, one support rod is for retaining one end of the banner with the second support rod is for retaining the other end of the banner. The bracket assembly comprises a first and second bracket having the above characteristics.

BRIEF DESCRIPTION OF THE DRAWINGS

So that the manner in which the above-recited features, advantages, and objects of the present invention are attained and can be understood in detail, a more particular invention, briefly summarized above, may be had by reference to the embodiments thereof which are illustrated in the appended drawings.

It is noted, however, that the appended drawings illustrate only typical embodiments of this invention and is therefore not to be considered limiting of its scope, for the invention may admit to other equally effective embodiments. Reference the appended drawings, wherein:

FIG. 4 is a side view of the present banner bracket with a banner support rod therein depicting several of the various rod orientations achievable in accordance with the present invention;

FIGS. 5a-h are diagrammatic representations of various banner configurations supportable by a pair of banner brackets in accordance with the present invention;

FIG. 8 is a perspective view of an alternative embodiment of a banner bracket;

FIG. 9 is a perspective view of the banner support rod assembly of the banner bracket depicted in FIG. 8;

FIG. 10 is a perspective view of an alternative embodiment of a banner support rod assembly for use in the banner bracket of FIG. 8;

DETAILED DESCRIPTION

Figure 1:
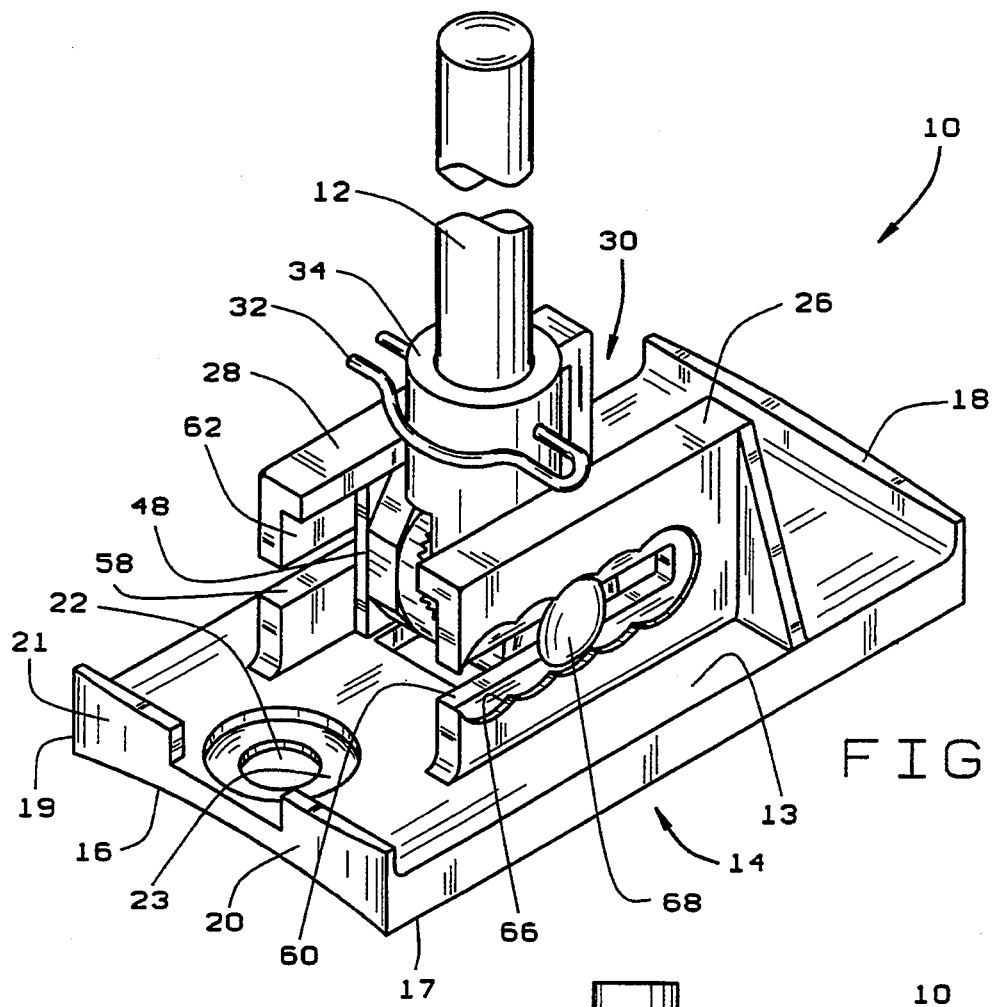
FIG. 1 is a perspective view of the present banner bracket with a banner support rod therein.
Figure 2:
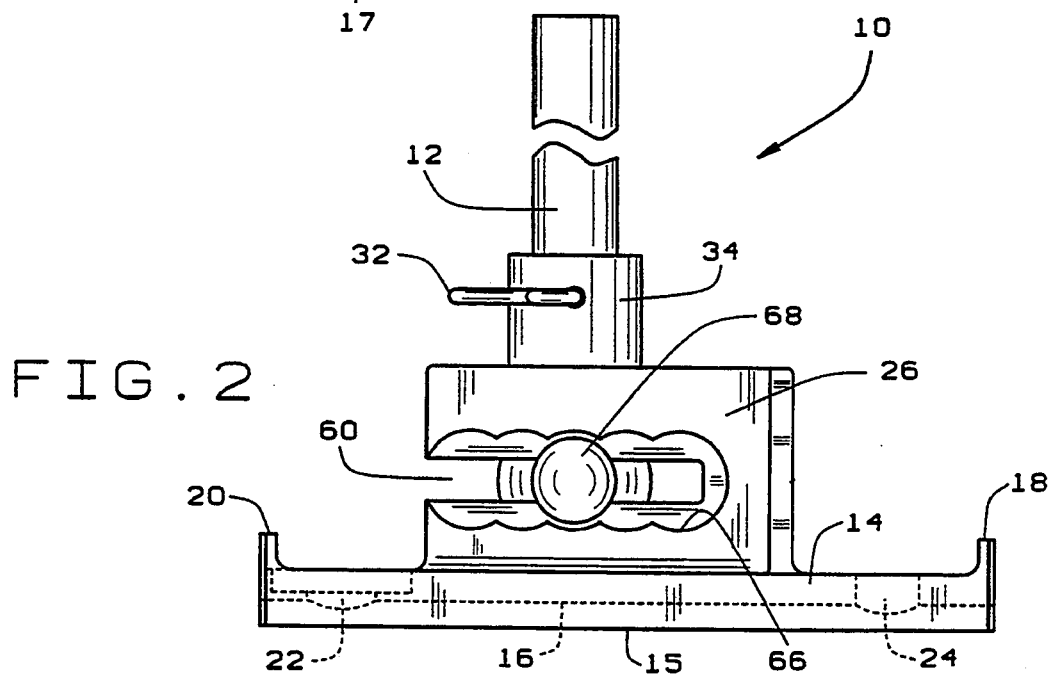
FIG. 2 is a side elevational view of the present banner bracket of FIG. 1.

Referring now to FIGS. 1 and 2, there is shown a banner bracket generally designated 10 retaining a banner support rod 12 in accordance with the present invention. Banner bracket 10 includes a plate-like member or base 14 defining an upper surface 13 and a lower surface 15. Lower surface 15 has a concave portion 16 that extends along the entire longitudinal length of base 14. Concave portion 16 defines a rate of curvature or arc from one edge 17 of base 14 to the other edge 19 of base 14 in order to conform to and facilitate the mounting thereof onto a street light pole, standard, or the like.

Figure 7:
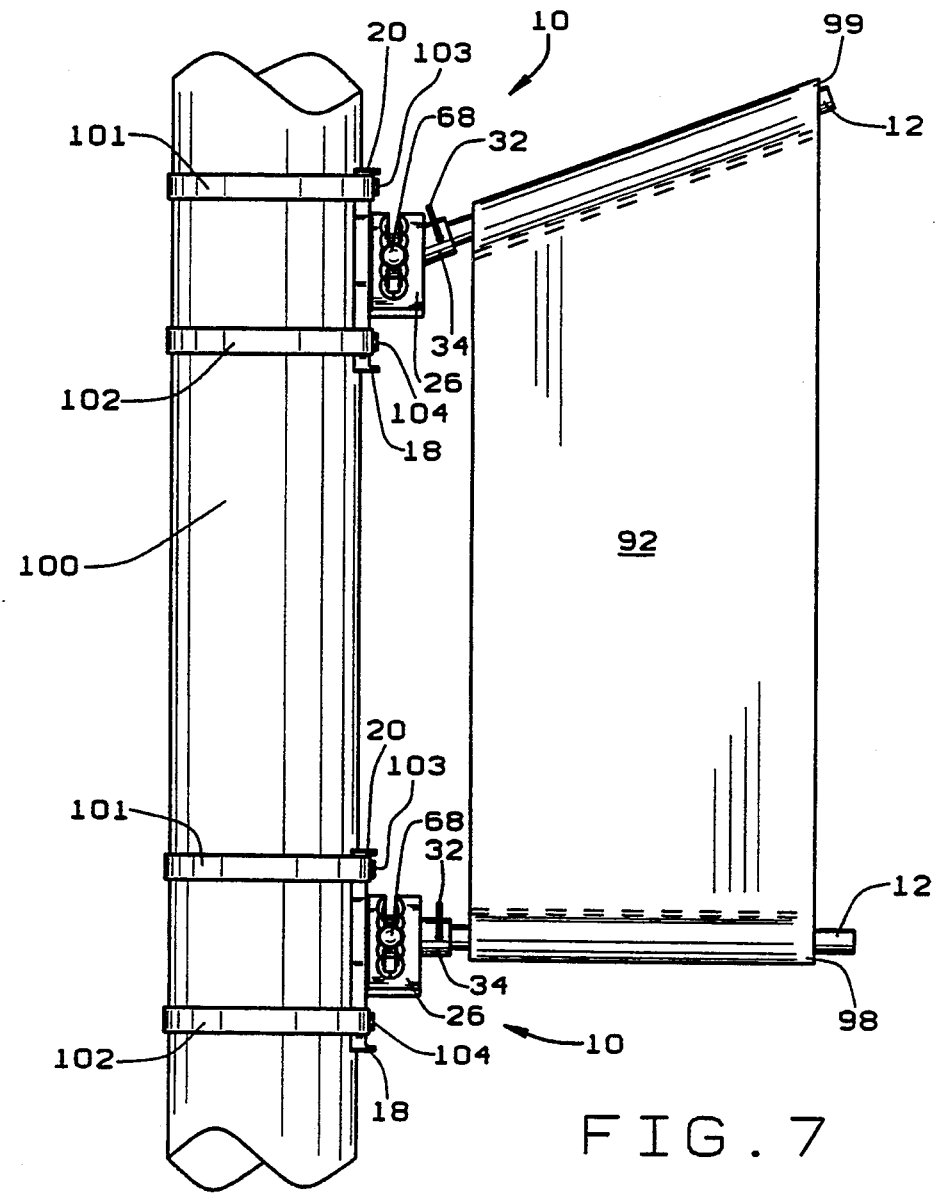
FIG. 7 is an elevational view of a pair of banner brackets attached to a standard supporting the banner of FIG. 5c.

On one short end of base 14 and extending the entire length thereof is an elongated flange 18 that is disposed essentially perpendicular to base 14. On the other short end of base 14 diametrically opposite flange 18 are two short flanges 20, 21 each extending essentially one-third of the length of the side. Flange 18 provides a positive stop at one end of base 14 for maintaining a mounting strap or band when mounting banner bracket 10. Likewise, flanges 20, 21 provide a positive stop at the other end of base 14 for maintaining a second mounting strap or band when mounting banner bracket 10 onto a post. As best depicted in FIG. 7, the mounting straps extend transverse to the elongate length of base 14 between the respective end flanges 18, 20, 21 and walls 91, 92. A first bore 22 and recess 23 are provided in base 14 on the end adjacent flanges 20, 21 through which is received a bolt 103 (see FIG. 7) for mounting banner bracket 10 onto a post. A second bore 24 is provided in base 14 on the end adjacent flange 18 through which is received a bolt 104 (see FIG. 7) for mounting banner bracket 10 onto a post. It should be understood that the present banner bracket may be mounted by straps, bolts, or both.

Figure 6:
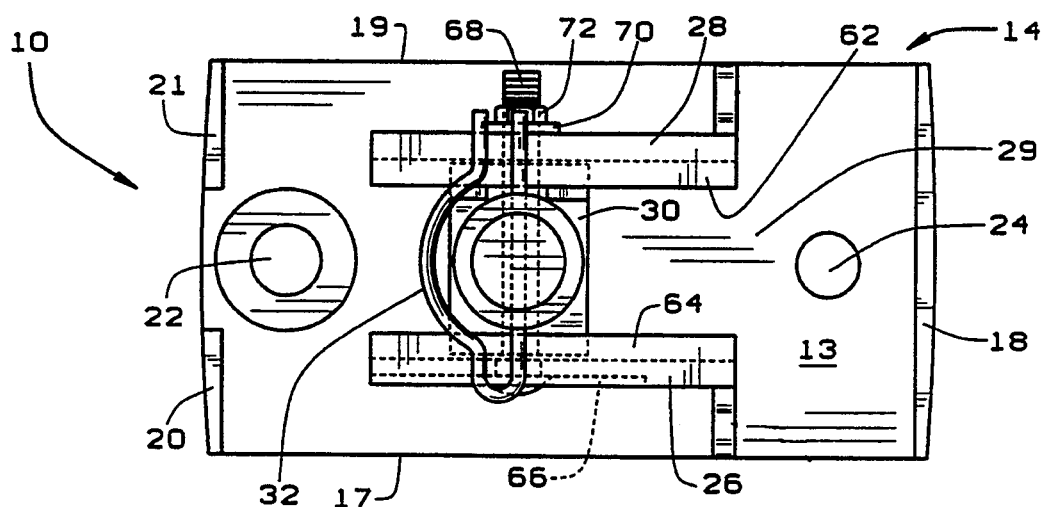
FIG. 6 is a top plan view of the present banner bracket.

Referring additionally to FIG. 6, integrally formed with base 14 are two upstanding walls 26, 28 spaced apart a given distance from each other thereby defining a channel 29. A rod holder assembly 30 is disposed in channel 29 and is free to travel longitudinally back and forth therein. When mounted on a post, rod holder assembly 30 slides in the vertical direction relative to the ground. As can be seen in FIG. 6, walls 26, 28 are located a distance inwardly from each respective end 17, 19 and longitudinally extend about half the distance of base 14, disposed essentially in the middle thereof. Wall 28 includes an elongated opening 58, while wall 26 includes a similar elongated opening 60, both openings 59, 60 extending essentially parallel to channel 29. Each wall 26, 28 further includes a respective rectangular slots 60, 62 with each slot defining an elongate channel on the inside surface thereof such that slots 60, 62 are opposed and thus face each other. Slots 60 and 62 serve as slide rails or tracks for rod holder assembly 30 restricting transverse movement of rod holder assembly 30 relative the longitudinal extent of channel 29. In this manner rod holder assembly 30 is movably retained by slots 60, 62 within channel 29 such that rod holder assembly 30 may only slide longitudinally along channel 29. However, as noted, rod holder assembly 30 may be selectively retained along channel 29. Slots 60, 62 are open on one end to allow rod holder assembly 30 to be removed therefrom to change the angle of banner rod 12 as explained hereinbelow, but includes stops, of which only one stop 76 of wall 28 is shown, on the other end to prevent rod holder assembly 30 from exiting therefrom.

Figure 3:
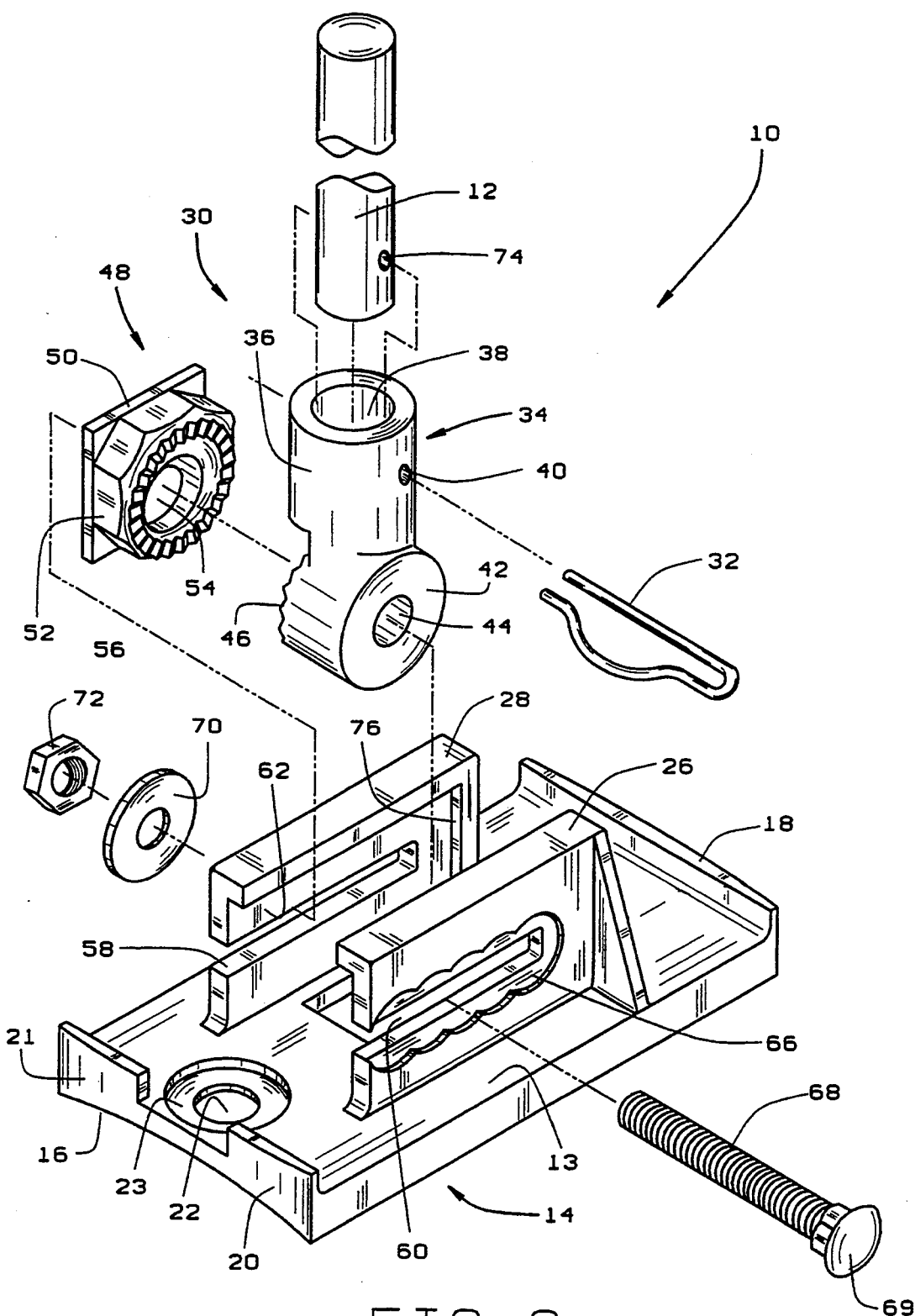
FIG. 3 is an exploded view of the present banner bracket.

With reference to FIG. 3, there is shown an exploded view of the present banner bracket depicting the constituent parts of the rod holder assembly 30. Rod holder assembly 30 includes a swivel member 34 with a first cylindrical portion 36 having a cylindrical bore 38 in which is received the banner support rod 12. Banner support rod 12 thus slidingly fits into cylindrical rod bore 38. A bore 40 through first cylindrical portion 36 aligns with a bore 74 in banner rod 12 when banner rod 12 is properly inserted in cylindrical rod bore 38. A cotter pin 32 is insertable through bores 40 and 74 to removably retain banner support rod 12 such that as rod holder assembly 30 moves, banner support rod 12 must move therewith.

Swivel member 34 further includes a second cylindrical portion 42 having a bolt bore 44 therethrough. Bolt bore 44 in second cylindrical portion 42 defines an axis that is essentially perpendicular to an axis defined by cylindrical rod bore 38. On one end of second cylindrical portion 42 is an annular set of teeth or ratchet 46. Rod holder assembly 30 also includes a sliding member 48 having a square back plate 50 and a nut-shaped front 52. A bolt bore 54 extends therethrough and is coaxial with bolt bore 44. On the outside surface of nut-shaped front 52 is a similar annular set of teeth or ratchet 56. Annular teeth 56 of sliding member 48 mate with annular teeth 46 of second cylindrical portion 42 when swivel member 34 and sliding member 48 are joined to form rod holder assembly 30. A bolt 68 transversely extends through elongated opening 60 of wall 26, bolt bore 44 of second cylindrical portion 42, bolt bore 54 of sliding portion 48, and elongated opening 58 of wall 28. A washer 70 and nut 72 secures the threaded end of bolt 68. In this manner, rod holder assembly 30 is releasably secured along its travel path within channel 29. It should be noted that wall 26 includes on the outside surface an elongated groove 66 defining a plurality of bolt head recesses that define incremental steps along the travel path of rod holder assembly 30 into which rod holder assembly 30 may be secured.

FIG. 4 depicts several banner rod 12 orientations that are achievable in accordance with the present invention. Banner rod 12, shown in solid, is set at an angle of 90° relative to the vertical, or an axis defined by the longitudinal, or vertical, travel path of rod holder assembly 30 within channel 29. The phantom lines depict essentially 45° and 135° angles relative the vertical. The various angles are set by rotating swivel portion 34 relative sliding portion 48 and then placing rod holder assembly 30 into channel 29. At this point, rod holder assembly 30 is restrained from angle change since the width of channel 29 defined by walls 26, 28, is only slightly greater than the total width of second cylindrical portion 42 and sliding member 48 when adjoining. This then prevents angle change once being set and placed within channel 29. Bolt 68 along with washer 70 and nut 72 set the placement of rod holder assembly 30 along the travel path, as bolt head 69 of bolt 68 abuts the respective bolt recess of elongated groove 66.

Swivel portion 34 is rotatable in 15° increments relative to sliding portion 48 and the axis of the travel path of rod holder assembly 30 such that banner support rod 12 may be set at angles anywhere from 0° to 180° in the 15° increments. It should be appreciated that the size and spacing of the two sets of annular teeth 46, 56, defines the angle increments, and thus it would be known to one skilled in the art to change the degree increments by changing the teeth size and spacing for finer angle increments or greater angle increments.

Because of the nature of the annular teeth 46 and 56 of rod holder assembly 30, there is introduced a slight cantilever since although a 90° angle for banner support rod 12 would be achievable due to the 15° increments, the rod holder assembly 30 does not start out at exactly 0°. Thus, the 90° setting is either slightly less than 90° or more than 90°, depending on which longitudinal end of the banner is being supported. Likewise each angular setting would be slightly off of the "true" degree angle. This, however, helps maintain the banner taut.

Referring now to FIGS. 5a-h, there are depicted various configurations of banners supportable by a pair of spaced apart banner brackets as more fully described hereinbelow. Because rod holder assembly 30 is adjustably tiltable through an angle of 180° from the vertical, each banner bracket 10 can hold taut a banner having angled longitudinal ends as well as straight longitudinal ends, or a combination thereof. It should be here appreciated that two pairs of banner brackets 10 may be utilized to hold two banners with one pair of brackets holding one banner adjacent another banner held by the other pair of brackets. In this manner, various styles of display banners may be achieved.

FIG. 5a depicts a banner 90 having a top longitudinal end is cut perpendicular to the vertical or at an angle of 90°, with a bottom longitudinal end cut at an angle of approximately 135° degrees. Thus, in the case of the support of banner 90 depicted in FIG. 5a, the upper banner bracket rod holder would be set at 90°, while the lower banner bracket rod holder would be set at approximately 135°. It should be here appreciated that due to the orientation of the incremental ratchet of the rod holder as described hereinabove, a slight cantilever is introduced to maintain the banner taut. FIG. 5b depicts a banner 91 having a top longitudinal end that is cut at an angle of approximately 45° from the vertical axis, while the bottom longitudinal end is cut at an angle of approximately 135°. Thus, the pair of banner bracket rod holders would be set accordingly. FIG. 5c depicts another banner 92 having a top longitudinal end that is cut at an angle of approximately 45°, with a bottom longitudinal end cut at an angle of approximately 90°. In FIG. 5d, a banner 93 has a top longitudinal end cut at an angle of approximately 135°, while the bottom longitudinal end is also cut at an angle of approximately 135°. A further banner 94 is depicted in FIG. 5e having a top longitudinal end cut at an angle of approximately 135°, with a bottom longitudinal end cut at an angle of approximately 90°. FIG. 5f depicts a banner 95 having a top longitudinal end cut at approximately 135°, with a bottom end cut at an angle of approximately 45°. A yet further banner 96 is depicted in FIG. 5g. Banner 96 has a top longitudinal end cut at approximately 45°, with a bottom end cut at an angle of approximately 45°. Lastly, FIG. 5h depicts a banner 97 having a top longitudinal end cut at approximately 90°, with a bottom end cut at an angle of approximately 45°. It should be noted that these shapes are only illustrative of some of the many banner configurations that may be held by the present banner brackets, and is not intended to be an all inclusive, limiting, or exhaustive list.

In a preferred form of this embodiment, base 14 along with integral upstanding lateral walls 26, 28, and rod support assembly 30 are all cast from an aluminum suitable for the wind loads and other stresses encountered by bracket 10. Here an Almag 35 aluminum ingot was used, but other non-rusting metals and fabrication techniques may be utilized as is known to one skilled in the art. Furthermore, rod 12 is fabricated from fiberglass, but may be aluminum or other any other material which provides adequate support and relative flexibility in order to flex under winds loads as explained hereinabove. Dimensionally, rectangular base 14 is 3½" by 7½", while the rod holder assembly 30 enjoys a total travel path distance of 2½". Rod 12 has an 11/16" diameter and a length of 32½", with an engagement diameter of 15/16" for receipt into the rod holder assembly.

Referring now to FIG. 7, the manner in which the present banner brackets are mounted and adjusted for various banner configurations is presented. Generally, the banner brackets are mounted on a street lamp post or similar pole structure. In FIG. 7, a pair of identical banner brackets 10 are shown mounted to a post or standard 100 in spaced relationship according to the longitudinal size and cut of the banner to be supported. Brackets 10 are shown mounted to post 100 via bolts 103, 104 as well as strapped thereto via metal straps or bands 101, 102. It should be noted that it is generally not necessary to have both bolts and straps, as either one or the other may be used, however, for illustrative purposes both mounting methods are depicted, as some applications may indeed require or suggest the use of both methods. Flanges 19, 20, 21 help retain straps 101, 102 about upper surface 13 of base 14 such that straps 101, 102 do not slide off of the bracket.

Then, depending on the angle of cut of the ends of the banner, here banner 92 (FIG. 5c) is depicted, the angle of rods 12 are set by setting the corresponding angle of the respective rod holder. This is accomplished while rod holder assembly 30 is outside of channel 29 since even when bolt 68 is completely loosened or not in place at all, the angle of rod holder assembly 30 cannot be changed when disposed within channel 29. As a practical matter, angles on the majority of banners are generally either 45°, 90°, or 135°.

Once the desired angle of each rod holder assembly 30 is set, the rod holder assembly is placed in the respective channel 29. The desired vertical placement of each rod holder assembly 30 is selected, which can be the same for both banner brackets 10 or may be different, depending on the placement of the banner brackets, and other factors such as stretching of the banner and the like. At this point, bolt 68 is inserted through wall 26, bores 44, 54, and wall 28. Nut 72 and washer 70 are placed on the threaded end of bolt 68 protruding from wall 28 and tightened. This sets the vertical distance.

Banner support rod 12 may already by in place within rod holder assembly 30 while adjustment is taking place, however, for ease of adjustment, it is preferable to insert banner support rod 12 after angular and vertical setting. One of the banner support rods 12 is inserted into the top pocket or sleeve 99 of banner 92, while the other of the banner support rods 12 is inserted into the bottom pocket or sleeve 98 of banner 92. Each banner support rod is placed in the respective rod holder assembly 12 and retained therein by the respective cotter pin 32. FIG. 6 shows a top view of the banner bracket 10 with the cotter pin 32 inserted therethrough.

Thus, once the desired angle for the banner is selected and set, any stretching of the banner or the like, may be easily countered by loosening nut 72 and sliding rod holder assembly 30 up, in the case of the upper banner bracket, and/or down, in the case of the lower banner bracket.

It can thus be appreciated that a change in length of the banner due to various factors can be easily accommodated for by vertical adjustment of a single bolt. Angular changes are likewise easily adjusted. Furthermore, a change in banners requires that only a cotter pin be removed to extricate the support rod from the rod holder, while a single bolt is loosened to change the length.

Referring now to FIG. 8, there is shown an alternate embodiment of the present banner bracket designated 80. In several respects, banner bracket 80 is identical to banner bracket 10 depicted in FIG. 1 with one exception being the rod holder assembly 30. However, the various parts have been re-numbered and are described hereinbelow. Banner bracket 80 includes an elongate plate-like member or base 82 defining an upper surface 83 and a lower surface 84. Lower surface 84 has a concave portion 85 that extends along the entire longitudinal length of plate 82. Concave portion 85 defines a rate of curvature or arc from first or front end 86 to a second or rear end 87 in order to conform to and facilitate the mounting thereof onto a street light pole, standard, post, or the like.

Extending along the length of rear end 87 is an elongated flange 88 that is essentially disposed perpendicular to plate 82. Disposed on the front end 86 of plate 82 diametrically opposite flange 88 are two flanges 89, 90 that each extend essentially one-third of the length of end 86 and are disposed essentially perpendicular to plate 82. Flange 88 provides a positive stop at the rear end 87 for locating a strap or band when mounting banner bracket 80 onto a post. Likewise, flanges 89, 90 provide a positive stop at the front end 86 of base 82 for locating a second strap or band when mounting banner bracket 80 onto a post. A bore 93 is disposed in plate 82 on the end adjacent flanges 89, 90 through which is received a bolt similar to bolt 103 in FIG. 7, for mounting banner bracket 80 onto a post. A second bore (not shown) is provided in plate 82 on the end adjacent flange 88 through which is received a similar bolt (see FIG. 7) for mounting banner bracket 80 onto a post.

Integrally formed with plate 82 are two upstanding walls 91, 92 spaced apart a given distance and defining a channel 96 in which a rod holder assembly 98 is slidably disposed. When mounted on a post, rod holder assembly 98 slides vertically relative to the ground. Walls 91, 92 are located a distance inwardly from each respective end and longitudinally extend about half the distance of base 82, disposed essentially in the middle thereof. Wall 92 includes an angle brace 94 for providing extra wind support, while wall 92 includes a similar angle brace (not shown) also for providing extra wind support.

Wall 91 includes a plurality of threaded bore pairs, each pair consisting of an upper threaded bore and a lower threaded bore. The pairs of threaded bores are longitudinally spaced apart. However, it should be noted that wall 92 is devoid of bores. As previously mentioned, rod holder assembly 98 is movable along channel 96 defined between walls 91 and 92. In order to selectively secure rod holder assembly 98 at various positions along channel 96, a pair of set screws or allen head screws 164, 165 are threadedly disposed in the upper and lower bore pairs of wall 91 depending on the desired location of rod holder assembly 98. The set screws 164, 165 extend through the selected upper and lower bores contacting one face of rod holder assembly 98 binding rod holder assembly 98 against the inner surface of wall 92 thereby rendering the rod holder-assembly 98 non-movable within channel 96.

Referring now to FIG. 9, there is shown an enlarged view of rod holder assembly 98. Rod holder 98 consists of a hexagon-shaped block or body defined by two faces, of which only one face 101 is shown, and six side surfaces 102, 103, 104, 105, 106 and 107. Disposed on one of the sides, here side 102, is a cylindrical member/rod holder 108 which is integrally formed therewith. Cylindrical member 108 defines a cylindrical opening 110 in which a banner rod 114 is received. Cylindrical member 108 includes a bore 112, while banner rod 114 also includes a bore 116. Banner rod 114 further includes a collar 118 of a frusto-conical shape such that as banner rod 114 is inserted into cylindrical opening 110 the collar 118 helps set the depth of banner rod 114 and to position bore 116 in alignment with bore 112 for placement of cotter pin 120 therethrough.

Thus, as described above, rod holder assembly 98 is longitudinally movable along channel 96 and selectively securable at various positions therealong through the use of pairs of set screws that extend through the upper and lower threaded bores pairs and abut the face 101 of body 100. Furthermore, rod holder assembly 98 is variably tiltable such that banner rod 114 may be angularly displaced relative to a perpendicular defined from plate 82. Angular displacement is accomplished by allowing rod holder assembly 98 to rest upon one of its sides 103–107. As depicted in FIG. 8, rod holder assembly 98 is resting on side 105. Thus, banner rod 114 is essentially 90° from the post on which banner bracket 80 is mounted. Should, however, the banner desirous of being mounted have a 45° or 135° angle measured from the post, rod holder assembly 98 may rest on either side 104 or 106 to achieve the desired angle.

As thus would be evident from one skilled in the art, and referring to FIG. 10, a rod holder assembly 126 having an octagon body 128 or other n-sided polygon shape may be utilized. As such, the other n-sided bodies may be used in order to increase the number of angular increments at which rod holder assembly and thus banner rod 114 may be oriented. In FIG. 10, body 128 includes eight sides 130–137. Disposed on and integral with side 130 is a cylindrical member 138 defining a cylindrical opening 140 in which an end of banner rod 114 is placed. Cylindrical member 138 further includes a bore 142 in which is received a cotter pin in like manner to that described in reference to FIG. 9.

Figure 11:
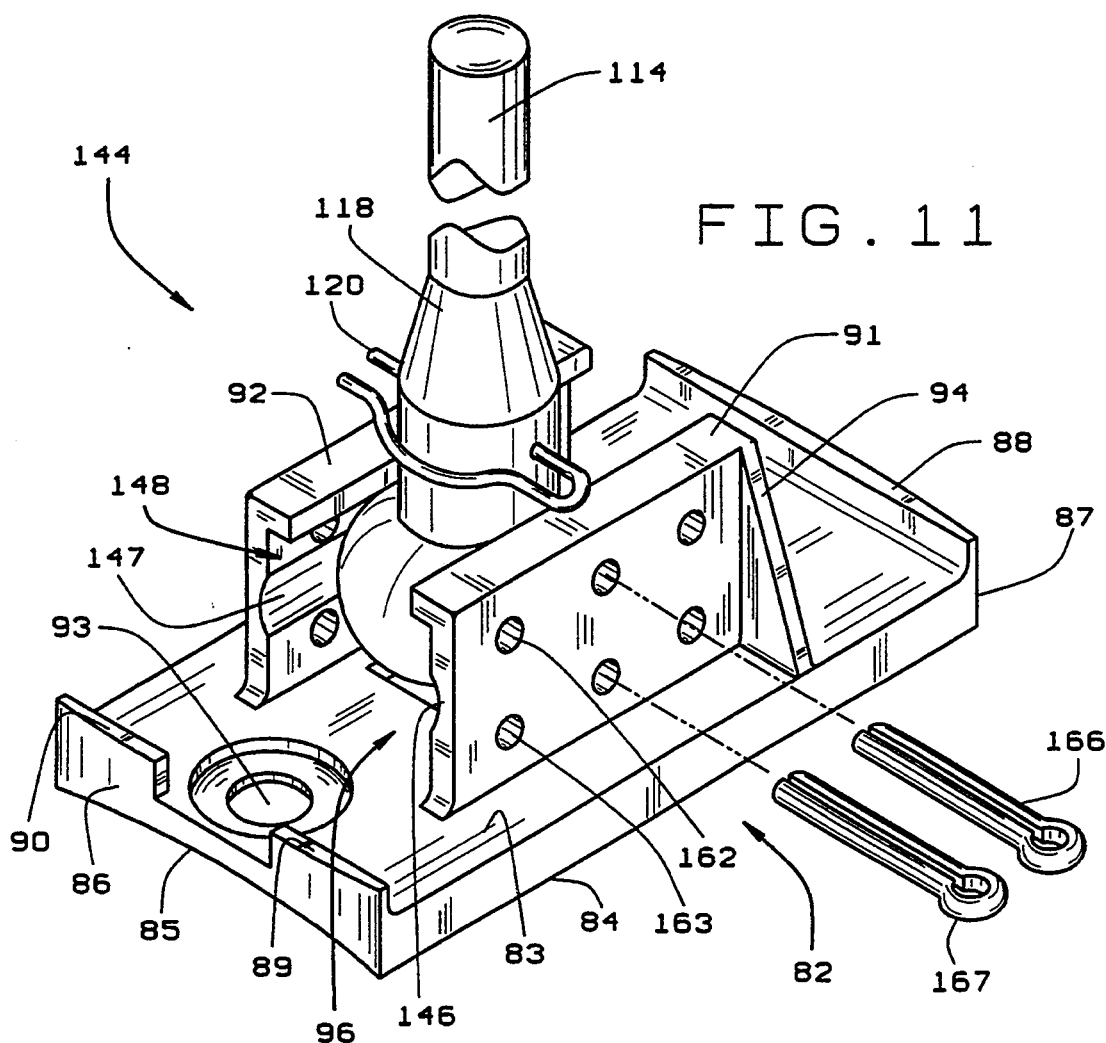
FIG. 11 is a perspective view of a further alternative embodiment of a banner bracket.
Figure 12:
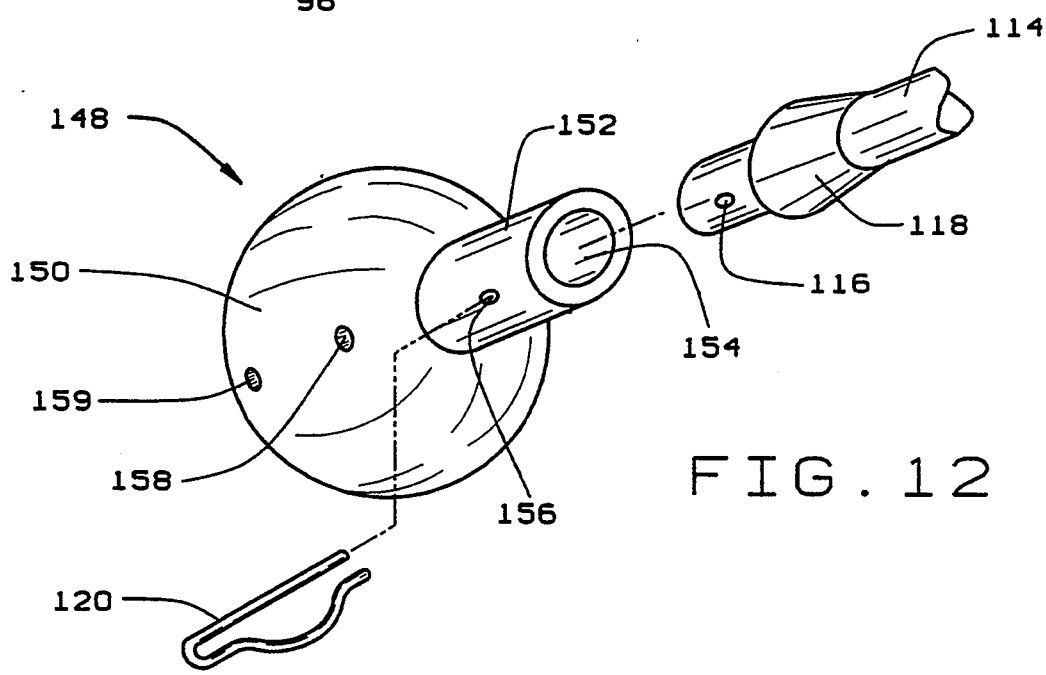
FIG. 12 is a perspective view of the banner support rod assembly of the banner bracket of FIG. 11.

Referring now to FIG. 11, there is shown a further embodiment of the present invention of a banner bracket generally designated 144. Banner bracket 144 is essentially as that described in FIG. 8 and includes similar reference numerals, with exception of those discussed hereinbelow. In this embodiment, walls 91 and 92 each has a plurality of longitudinally spaced pairs of upper and lower bores 162 and 163. Each wall 91 and 92 includes an elongate slot 146, 147, respectively, on the inside face or surface thereof. The slots 146, 147 each extend the longitudinal length of the channel 29. A rod holder assembly 148 consisting essentially of a spherical body 150, FIG. 12, is slidably disposed within the channel and retained against transverse movement by elongate grooves 146, 147.

Spherical body 150 includes bores 158 and 159 and an integral cylindrical member 152. Cylindrical member 152 defines a cylindrical opening 154 and bore 156. An end of banner rod 114 is insertable into opening 154 and is secured by a cotter pin 120 extending through bore 156 and bore 116. Thus, the banner bracket assembly depicted in FIG. 11 allows the spherical bodied banner rod assembly 148 to longitudinally move within channel 96.

Furthermore, spherical body 148 is angularly adjustable by inserting cotter pins 166, 167 or the like in the respective bores of walls 91 and 92 through bores 158 and 159.

While the foregoing is directed to the preferred embodiment of the present invention, other and further embodiments of the invention may be devised without departing from the basic scope thereof, and the scope thereof is determined by the claims which follow.

What is claimed is:

1. A bracket for holding a banner rod, the bracket comprising:
   a base plate having an upper surface and a lower surface, said base plate adapted to be secured to a post such that said lower surface abuts the post;
   a pair of spaced apart members disposed on said upper surface of said base plate, said pair of spaced apart members defining an elongate channel; and
   a rod holder disposed within said channel and adapted to retain a banner rod for supporting an end of a banner, said rod holder being movable along the length of said elongate channel and selectively securable at various locations such that the vertical position of the banner rod may be varied relative to ground.

2. The bracket of claim 1, wherein said rod holder is selectively angularly adjustable relative to the post through an arc of 180°.

3. The bracket of claim 2, wherein:
   said rod holder comprises a body having two essentially parallel end faces that are disposed adjacent inner surfaces of said spaced apart members, a plurality of sides disposed essentially perpendicular to said faces forming a polygon-shaped body, and a tubular member disposed on one of said plurality of sides for supporting an end of the banner rod; and
   one of said spaced apart members including a plurality of threaded bores for receiving set screws, the set screws contacting one of said faces of said body to selectively secure said rod holder along said channel.

4. The bracket of claim 3, wherein said plurality of sides equals six.

5. The bracket of claim 3, wherein said plurality of sides equals eight.

6. The bracket of claim 2, wherein:
   said rod holder comprises a spherical body, a tubular member disposed on said spherical body and radially extending therefrom, said tubular member adapted to retain a banner rod, and a pair of upper and lower bores each extending through said spherical body; and
   each of said pair of spaced apart members includes an elongate slot on an inner surface thereof and extending along the length of said channel, said spherical body engaging said elongate slots, and a plurality of bores for receiving set pins, the set pins extending through said upper and lower bores of said spherical body and said bores of each spaced apart member to selectively secure said rod holder along said channel.

7. A banner bracket for retaining a banner rod, the banner bracket comprising:
   a base plate having an upper surface and a lower surface;
   a first wall disposed on said upper surface;
   a second wall disposed on said upper surface and spaced from said second surface, said first wall and said second wall defining a channel therebetween;
   a banner rod holder slidably disposed within said channel and adapted to be secured at various positions along said channel to thereby set the vertical height of said banner rod holder when the banner bracket is mounted onto a post, said banner rod holder defining a body having a first face and a second face diametrically opposed to said first face, said first face and said second face disposed adjacent inner surfaces of said first wall and said second wall respectively, a plurality of sides each disposed between and perpendicular to said first and second faces, and a tubular member having an opening for receiving the banner rod.

8. The banner bracket of claim 7, wherein said first wall includes a plurality of longitudinally-spaced upper and lower threaded bore pairs, said banner rod holder retained in said channel by set screws extending through one pair of upper and lower threaded bore pairs in said first wall, said set screws contacting said first face to render said banner rod holder releasably immobile.

9. The banner bracket of claim 7, wherein said tubular member is angularly setable relative to said base plate in order to accommodate various banner configurations by changing which one of said sides abuts said upper surface of said base plate.

10. The banner bracket of claim 7, wherein said plurality of sides equals six.

11. A banner bracket for retaining a banner rod, the banner bracket comprising:
    a base plate having an upper surface and a lower surface;
    a first wall disposed on said upper surface;

a second wall disposed on said upper surface and spaced from said first wall thereby defining a channel between inner surfaces of said first and second walls;

a first elongate slot disposed in the inner surface of said first wall and extending the length of said channel;

a second elongate slot disposed in the inner surface of said second wall and extending the length of said channel;

a rod holder slidably disposed in said channel and contacting said first and second elongate slots, said rod holder having a spherical body and a tubular member radially extending from said spherical body, said tubular member adapted to releasably retain the banner rod, said spherical body having a pair of bores for fixing said rod holder along said channel.

12. The banner bracket of claim 11, wherein said first and second walls each includes a plurality of longitudinally-spaced upper and lower pairs of bores, said banner rod holder retained in said channel by pins extending through diametrically opposed pairs of upper and lower pairs of bores in said first and second walls and said pair of bores of said spherical body.

13. The banner bracket of claim 11, wherein said tubular member is angularly setable relative to said base plate in order to accommodate various banner configurations by angularly displacing said spherical body and placing the pins through corresponding bores in said first and second walls.

14. A bracket support assembly consisting of a first banner bracket and a second banner bracket each mountable on a post for respectively holding a first and second banner support rod to support and maintain a banner taut, one banner bracket holding a first banner rod for retaining one end of the banner, and another banner bracket holding a second banner rod for retaining another end of the banner, each banner bracket comprising the banner bracket of claim 1.

15. A bracket support assembly consisting of a first banner bracket and a second banner bracket each mountable on a post for respectively holding a first and second banner support rod to support and maintain a banner taut, one banner bracket holding a first banner rod for retaining one end of the banner, and another banner bracket holding a second banner rod for retaining another end of the banner, each banner bracket comprising the banner bracket of claim 7.

16. A bracket support assembly consisting of a first banner bracket and a second banner bracket each mountable on a post for respectively holding a first and second banner support rod to support and maintain a banner taut, one banner bracket holding a first banner rod for retaining one end of the banner, and another banner bracket holding a second banner rod for retaining another end of the banner, each banner bracket comprising the banner bracket of claim 11.

* * * * *